July 25, 1967  E. L. CLARK  3,332,510
GENERATION OF SIGNALS BY RAPID VAPORIZATION
OF METALLIC ELEMENTS
Filed July 12, 1963  2 Sheets-Sheet 1

INVENTOR
E. L. CLARK

BY Young + Quigg

ATTORNEYS

United States Patent Office 3,332,510
Patented July 25, 1967

3,332,510
GENERATION OF SIGNALS BY RAPID VAPORIZATION OF METALLIC ELEMENTS
Ernest L. Clark, Bartlesville, Okla., assignor to Phillips Petroleum Company, a corporation of Delaware
Filed July 12, 1963, Ser. No. 294,698
4 Claims. (Cl. 181—.5)

This application is a continuation-in-part of application Ser. No. 216,565, filed Aug. 13, 1962, now abandoned.

This invention relates to the generation of acoustical signals. In another aspect it relates to the injection of identifiable materials into fluids.

A knowledge of the velocity of propogation of acoustical waves in earth formations is valuable in analyzing oil producing regions intersected by wells and in making seismic surveys. These velocities can be measured by lowering an acoustical signal generator and one or more detectors into a well to make measurements at various depths. Signal generators for use in this manner should be capable of establishing sharply defined acoustical signals repetitively in order that a plurality of measurements can be made in a given well.

A first embodiment of this invention is directed toward providing an acoustical signal generator which can be employed to advantage in well logging and seismic studies. The acoustical signal is generated by rapidly vaporizing a small segment of metal wire or foil which is positioned within a liquid. The resulting heat vaporizes a small amount of the liquid to form a gas pocket. The formation of this gas pocket and the subsequent rapid movement of liquid back into the space originally occupied by the gas pocket when it escapes as a bubble results in the generator of a sharp acoustical pulse. Apparatus is provided for feeding a segment of wire or foil periodically between spaced electrodes which are connected to a source of electrical current. The rapid passage of a large surge of current through the wire or foil between the electrodes generates sufficient heat to vaporize the wire or foil.

In accordance with a second embodiment of this invention, an identifiable substance is injected into a fluid. For example, by constructing the wire or foil of a radioactive material, the minute fragments resulting from the vaporization of the wire or foil provide a cloud of radioactive material. If this cloud enters a moving fluid, the velocity or path of the fluid can be observed by the use of radiation detectors. This procedure is quite effective in measuring the flow of liquids in inaccessible regions such as boreholes.

Accordingly, it is an object of this invention to provide a novel signal generator.

Another object is to provide a method of generating acoustical signals in liquids.

A further object is to provide a method of and apparatus for injecting radioactive material into liquids.

A further object is to provide a method of and apparatus capable of generating signals in boreholes.

Other objects, advantages and features of the invention should become apparent from the following detailed description, taken in conjunction with the accompanying drawing in which.

Figure 1:
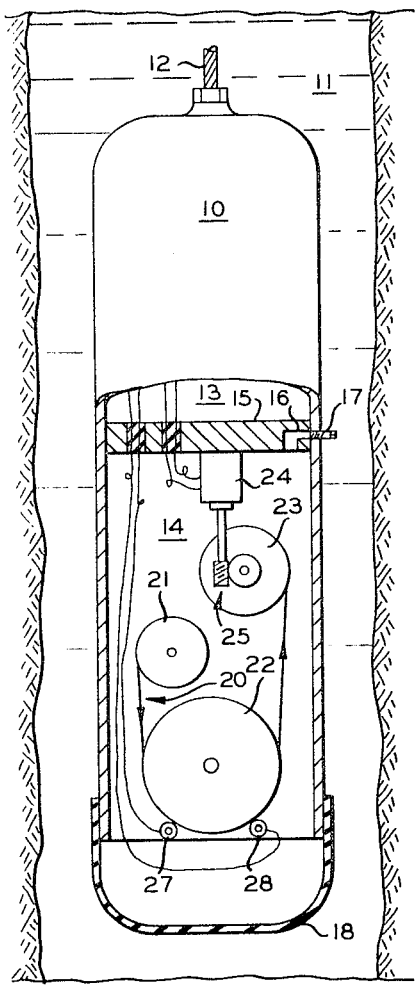
FIGURE 1 illustrates an embodiment of the signal generator of this invention disposed in a borehole.

Referring now to the drawing in detail and to FIGURE 1 in particular, there is shown a casing 10 which is suspended within a borehole 11 by means of a cable 12. The interior of casing 10 is divided into upper and lower compartments 13 and 14 by means of a bulkhead 15. Most of the electrical components of the signal generator, which are described in detail hereinafter, are positioned within compartment 13. The mechanical components of the signal generator are positioned in lower compartment 14 which is filled with a fluid, such as a light oil. This fluid can be inserted through a port 16 which is closed by a plug 17.

A tape 20 is stored on a first reel 21 which is mounted within chamber 14. This tape extends about the periphery of a pulley 22 and is attached at its other end to a take-up reel 23. Reel 23 is adapted to be rotated by a motor 24, the drive shaft of which is connected to reel 23 by means of gears 25. First and second electrodes 27 and 28 are positioned so as to engage tape 20 as it passes about pulley 22. These electrodes can be mounted by means of suitable springs, not shown, so that the electrodes make firm contact with the tape at all times.

Figure 2:
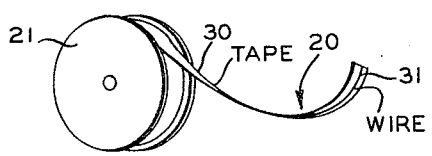
FIGURE 2 illustrates the wire which is vaporized in accordance with the invention to provide an acoustical signal.

An embodiment of tape 20 is illustrated in FIGURE 2. This tape comprises a layer 30 of cloth or suitable plastic which is capable of withstanding elevated temperatures of short duration. A wire or layer of metal foil 31 is mounted on the face of the tape. The tape is positioned in the apparatus of FIGURE 1 so that the wire is on the outside and is engaged by electrodes 27 and 28.

Figure 3:
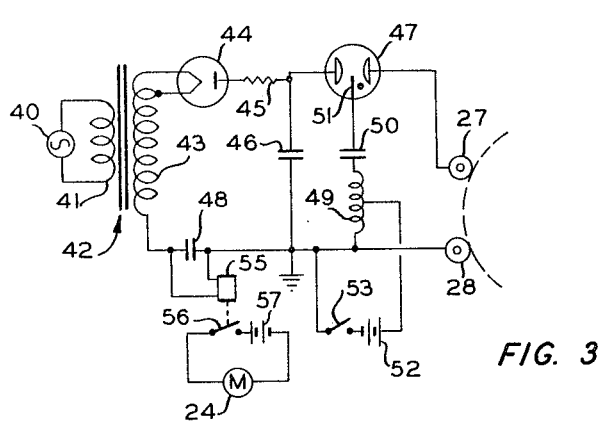
FIGURE 3 is a schematic circuit drawing of the electrical components associated with the signal generator of FIGURE 1.

A suitable circuit for energizing the signal generator is illustrated schematically in FIGURE 3. An alternating current source 40 is connected across the primary winding 41 of a step-up transformer 42. The first end terminal of the secondary coil 43 of transformer 42 is connected to one terminal of the heater-cathode of a rectifier 44. The second terminal of this cathode is connected to winding 43 adjacent the first end terminal thereof. The anode of rectifier 44 is connected through a resistor 45 to the first terminal of a capacitor 46. The second terminal of capacitor 46 is connected to the second end terminal of transformer winding 43 through a capacitor 48. The first terminal of capacitor 46 is connected through a spark gap switch 47 to electrode 27. The second terminal of capacitor 46 is connected to electrode 28. The coil 49 of an autotransformer is connected between the second terminal of capacitor 46 and the first terminal of a capacitor 50. The second terminal of capacitor 50 is connected to a probe 51 which extends into spark gap switch 47. A battery 52 and a switch 53 are connected in series between one end terminal of coil 49 and an intermediate point thereon. A relay coil 55 is connected in parallel with capacitor 48. When relay coil 55 is energized, a switch 56 is closed. This connects motor 24 in circuit with a battery 57.

In the operation of the circuit illustrated in FIGURE 3, switch 53 initially is open. Rectifier 44 conducts for a short period of time to charge capacitor 46. During this time, current flows through relay coil 55 to close switch 56. This results in motor 24 being energized to move a segment of tape 20 from reel 21 toward reel 23. When it is desired to actuate the signal generator, switch 53 is closed so that a current pulse flows through the lower portion of coil 49. This induces a voltage in the upper portion of the coil which transmits a spark to switch 47. This spark causes the switch to conduct so that capacitor 46 is discharged through the segment of wire positioned between electrodes 27 and 28. As previously mentioned, the rapid surge of current through wire 31 results in the wire being vaporized. It is desirable that transformer 42 be of such configuration as to establish a large output voltage and that capacitor 46 be quite large so that a substantial amount of energy is stored by the capacitor. A current flow of several thousand amperes through the wire is desirable to produce rapid vaporization. During the next cycle of operation, motor 24 is again energized when capacitor 46 is charged so that a new segment of wire is positioned between electrodes 27 and 28.

As previously mentioned, the electrical components of the signal generator can advantageously be located in chamber 13. Alternating current source 40 can be located at the surface with connecting leads passing through cable 12. Of course, a portable power supply can be mounted in chamber 13 if necessary. Switch 53 can be operated periodically by means of a timer, not shown, which can be contained within chamber 13 or connected to the mechanism which lowers the casing into the well so that the switch is operated each time the casing is lowered by a given amount. If desired, switch 53 can be located at the surface with connecting wires passing through cable 12.

The acoustical signal generator of this invention can be employed in various operations wherein it is desired to generate sharp acoustical pulses. The apparatus can be employed in making seismic surveys, for example, by lowering casing 10 into a shot hole. Diaphragm 18 and the oil within chamber 14 are generally desirable to protect the mechanism from dirt or corrosive fluids which may be present in boreholes. However, if the mechanism is operated in relatively clean fluids, diaphragm 18 can be omitted so that the mechanism is disposed directly in the fluid in which the signal is to be generated.

In accordance with a second embodiment of this invention, the wire or foil to be vaporized is constructed at least in part of a radioactive material. The minute fragments which result from the vaporization of the wire or foil provide a cloud of radioactive material. This procedure is particularly useful when it is desired to measure the flow of fluids in inaccessible regions. Such a need occurs, for example, in measuring fluid flows through boreholes, such as in water injection wells. Apparatus which can be employed for this purpose is illustrated schematically in FIGURE 4. A housing 10' is positioned in a well 11', in which the flow of liquid is to be measured. In this particular well, it is assumed that it is desired to measure the flow of liquid downwardly. The signal generating apparatus of this invention is disposed in the upper region of housing 10'. The housing is provided with a plurality of ports 60 to permit well fluid to enter the housing in the region of the signal generator. The wire or foil to be vaporized is constructed of a radioactive material so that fragments of such material become entrained in the well fluid and are carried downwardly through the well with the water. First and second radiation detectors 61 and 62 are carried by the housing in spaced relationship with the signal generator to provide output signals at such time as the radioactive material moves past the detectors. These detectors are shielded so as to respond only to the radioactive material being at the depths of the individual detectors.

Figure 4:
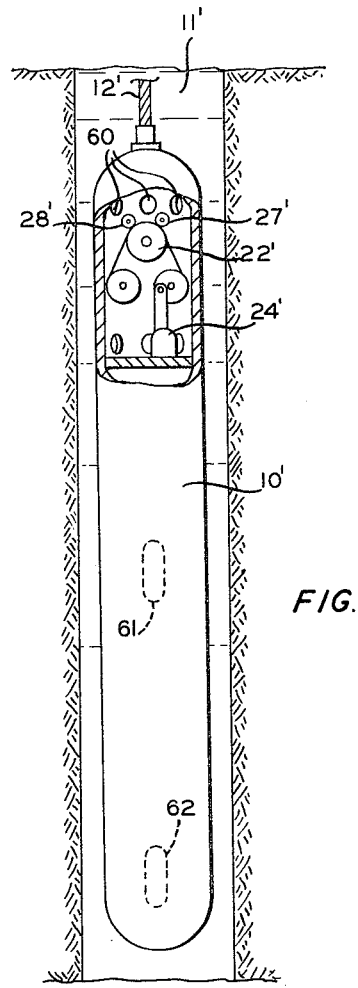
FIGURE 4 illustrates flow measuring apparatus employing the signal generator of this invention.
Figure 5:
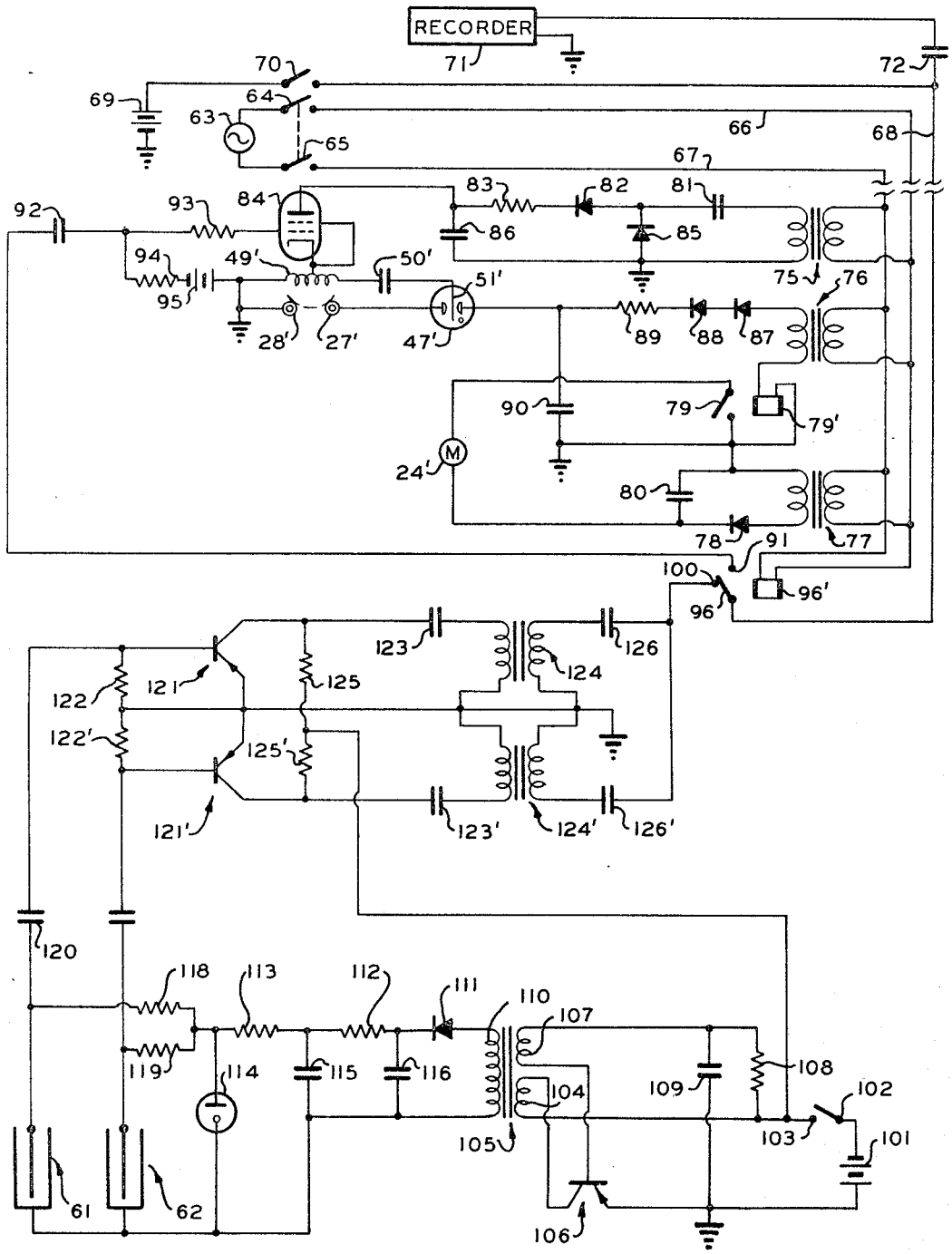
FIGURE 5 is a schematic circuit drawing of the electrical components associated with the signal generator of FIGURE 4.

The electrical circuit associated with the signal generator and the detectors of FIGURE 4 is illustrated schematically in FIGURE 5. A source of alternating current 63, which can be positioned at the surface, is connected by means of switches 64 and 65 to leads 66 and 67 which extend through cable 12' to housing 10'. A third lead 68 also extends from the surface through cable 12' to the downhole equipment. The first terminal of a current source 69 is connected to lead 68 by means of a switch 70. The second terminal of current source 69 is connected to ground. The first terminal of a recorder 71 is connected by means of a capacitor 72 to conductor 68. The second terminal of recorder 71 is connected to ground. The remainder of the apparatus illustrated in FIGURE 5 is positioned within housing 10'.

The primary windings of transformers 75, 76 and 77 are connected across conductors 66 and 67. The first end terminal of the secondary winding of transformer 77 is connected through a rectifier 78 to the first terminal of motor 24'. The second terminal of motor 24' is connected to ground when a switch 79 is closed. The second terminal of the secondary winding of transformer 77 is connected directly to ground. A capacitor 80 is connected in parallel with the secondary winding of transformer 77. Rectifier 78 and capacitor 80 thus form a source of direct potential which energizes motor 24' at such time as switch 79 is closed.

The first terminal of the secondary winding of transformer 75 is connected through a capacitor 81, a rectifier 82 and a resistor 83 to the anode of a vacuum tube 84. The second terminal of this transformer winding is connected to ground. A rectifier 85 is connected between ground and the junction between elements 81 and 82. A capacitor 86 is connected between the anode of tube 84 and ground. These circuit elements provide a direct potential to permit operation of tube 84.

The first terminal of the secondary winding of transformer 76 is connected through rectifiers 87 and 88 and a resistor 89 to the first electrode of spark gap switch 47'. The second terminal of the secondary winding of transformer 76 is connected to ground through a relay coil 79'. A capacitor 90 is connected between switch 47' and ground. Capacitor 90 is charged by the circuit elements associated with transformer 76 to provide energy to vaporize the wire between electrodes 27' and 28'.

A terminal 91 is connected through a capacitor 92 and a resistor 93 to the control grid of tube 84. The junction between elements 92 and 93 is connected by means of a resistor 94 to the negative terminal of a voltage source 95. The positive terminal of voltage source 95 is connected to grounded electrode 28'. Electrode 51' of switch 47' is connected to ground through capacitor 50' and coil 49'. The cathode of tube 84 is connected to a tap on coil 49'. A switch 96, which is connected to lead 68, engages terminal 91 when a relay coil 96' is energized. Relay coil 96' is connected across leads 66 and 67.

When it is desired to actuate the signal generator of FIGURE 5, switches 64 and 65 are closed to energize the downhole circuit. This energizes relay coil 96' to connect lead 68 to capacitor 92. A positive potential is applied to the anode of tube 84 at this time, and capacitor 90 is charged by the circuit elements associated with transformer 76. At the time capacitor 90 is being charged, relay coil 79' is energized to close switch 79. This energizes motor 24' to move a fresh piece of wire between electrodes 27' and 28'. Switch 70 is then closed momentarily to actuate the signal generator. Closure of switch 70 applies a pulse to the control grid of tube 84 which causes the tube to conduct. The resulting flow of current through the left portion of coil 49' applies a pulse to electrode 51' so that switch 47' conducts to permit capacitor 90 to discharge through the wire between electrodes 27' and 28'. Thereafter, capacitor 90 recharges and motor 24' is again actuated to advance the tape which carries the wire.

As previously mentioned, the wire or foil is constructed, at least in part, of a radioactive material. Examples of suitable materials for this purpose include iron$^{59}$, zinc$^{65}$, silver$^{110}$ and antimony$^{124}$. These particular isotopes are currently available from the Atomic Energy Commission at Oak Ridge, Tenn. In one specific embodiment of this invention, five inches of iron$^{59}$ having a diameter of 0.004 inch was quite effective in establishing a cloud of radioactive material in the surrounding water. The wire or foil can be constructed completely of a radioactive material or the radioactive material can be plated on a conventional wire or formed as an alloy. The minute particles which result from the vaporization of the wire form a cloud which is suspended in the liquid which surrounds the signal generator. If this liquid is flowing downwardly through the well, the radioactive material will energize detectors 61 and 62 in sequence. By measuring the times at which these detectors are energized, the rate of flow of fluid through the well readily becomes apparent. A suitable detection circuit for this purpose is included in the apparatus of FIGURE 5.

Detectors 61 and 62 can advantageously be Geiger tubes. The detection circuit is connected to recorder 71 at the surface when relay coil 96' is not energized. As soon as the radioactive cloud is formed, switches 64 and 65 are opened to deenergize relay coil 96'. This connects switch 96 to a terminal 100 which receives the output signals from detectors 61 and 62.

Geiger tubes 61 and 62 are energized from a voltage source 101. The first terminal of this voltage source is connected to ground. The second terminal is connected to a switch 102 which is adapted to engage a terminal 103. Switch 102 can be closed at the time the apparatus is lowered into the well, or it can be a pressure or clock actuated switch which closes at such time as a predetermined depth is reached in the well. This alternative conserves the battery during the time the apparatus is being lowered into the well. Terminal 103 is connected to the first terminal of the first winding 104 of a transformer 105. The second terminal of winding 104 is connected to the collector of a transistor 106. The emitter of transistor 106 is connected to ground. The base of transistor 106 is connected to the first terminal of a second winding 107 of transformer 105. The second terminal of winding 107 is connected by means of a resistor 108 to terminal 103. A capacitor 109 is connected between transformer winding 107 and ground. The circuit elements thus far described constitute an oscillator which energizes transformer 105.

The first terminal of the secondary winding 110 of transformer 105 is connected through a rectifier 111 and resistors 112 and 113 to the first electrode of a voltage regulating tube 114. The second electrode of tube 114 is connected to the second end terminal of transformer winding 110. A first filter capacitor 115 is connected between transformer winding 110 and the junction between elements 112 and 113, and a second filter capacitor 116 is connected between transformer winding 110 and the junction between elements 111 and 112. The casings of Geiger tubes 61 and 62 are connected to the second terminal of transformer winding 110. The center electrodes of these two tubes are connected to the first electrode of voltage regulating tube 114 through respective resistors 118 and 119. The circuit elements associated with the secondary winding of transformer 105 thus provide operating potentials for tubes 61 and 62.

The center electrode of tube 61 is connected through a capacitor 120 to the base of a transistor 121. The emitter of transistor 121 is connected directly to ground, and the base of transistor 121 is connected to ground by means of a resistor 122. The collector of transistor 121 is connected by means of a capacitor 123 to the first terminal of the primary winding of an output transformer 124. The second terminal of this transformer winding is connected to ground. A resistor 125 is connected between the collector of transistor 121 and terminal 103. The first terminal of the secondary winding of transformer 124 is connected through a capacitor 126 to terminal 100. The second terminal of the secondary winding of transformer 124 is connected to ground. Thus, the presence of radioactive material in the region of tube 61 results in conduction through the tube which applies an output pulse through capacitor 120. This pulse is amplified and transmitted to recorder 71 at the surface. A similar detection circuit is associated with tube 62, and corresponding elements are designated by like primed reference numerals. However, the winding of transformers 124 and 124' are reversed so that pulses of a first polarity are provided by transformer 124 and pulses of a second polarity are provided by transformer 124'. In this manner, the two pulses can be distinguished on recorder 71. The time difference between the arrival of radioactive material at detectors 61 and 62 thus provides an indication of the rate of flow of well fluid in the borehole.

While this invention has been described in conjunction with presently preferred embodiments, it should be evident that it is not limited thereto.

What is claimed is:

1. Acoustical signal generating apparatus comprising first and second spaced electrodes, a flexible tape having a metallic element on one side thereof extending longitudinally of said tape, a storage means for said tape, a receiving means for said tape, means to move said tape from said storage means to said receiving means so that said metallic element is engaged by and extends between said electrodes, a capacitor, means to charge said capacitor, and means to connect said capacitor across said electrodes so as to discharge said capacitor through the segment of said metallic element between said electrodes.

2. The signal generator of claim 1 wherein said means to move said tape comprises a motor, and means responsive to said means to charge said capacitor to energize said motor to advance said tape past said electrodes.

3. The apparatus of claim 1 wherein said element is formed at least in part of a radioactive material.

4. Signal generating apparatus comprising a housing containing first and second spaced electrodes, a flexible tape having a metallic element on one side thereof extending longitudinally of said tape, a storage means for said tape, a receiving means for said tape, means to move said tape from said storage means to said receiving means so that said metallic element is engaged by and extends between said electrodes, and a liquid surrounding said tape between said electrodes; a capacitor; means to charge said capacitor; and means to connect said capacitor across said electrodes so as to discharge said capacitor through the segment of said metallic element between said electrodes.

References Cited

UNITED STATES PATENTS

| 3,078,403 | 2/1963 | Wolcott | 340—12 |
| 3,099,813 | 7/1963 | Anderson | 340—12 |
| 3,116,419 | 12/1963 | Martin | 250—106 |

OTHER REFERENCES

Martin, Edward A.: Experimental Investigation of a High-Energy Density, High-Pressure Arc Plasma, Journal of Applied Physics, volume 31, No. 2, pp. 255–267, February 1960.

BENJAMIN A. BORCHELT, *Primary Examiner.*

R. M. SKOLNIK, *Assistant Examiner.*